3,136,892
DENSITY DETERMINING APPARATUS COMPRISING RADIOACTIVE SOURCE AND DETECTOR
Robert R. Willett and Larry F. Hansen, Minneapolis, Minn., assignors to Nucleonic Controls Corp., Minneapolis, Minn., a corporation of Minnesota
Filed Jan. 30, 1961, Ser. No. 85,868
7 Claims. (Cl. 250—83.3)

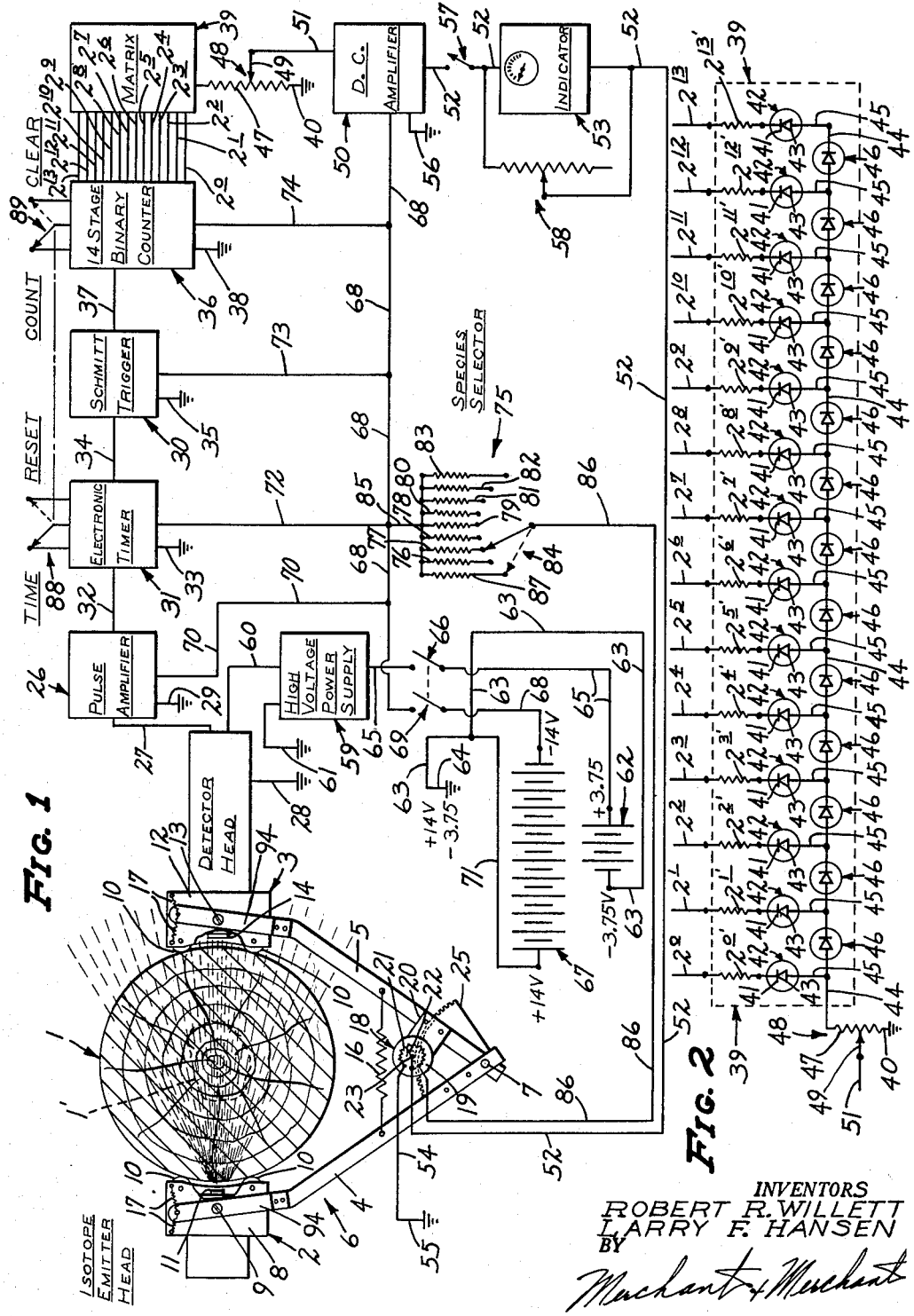

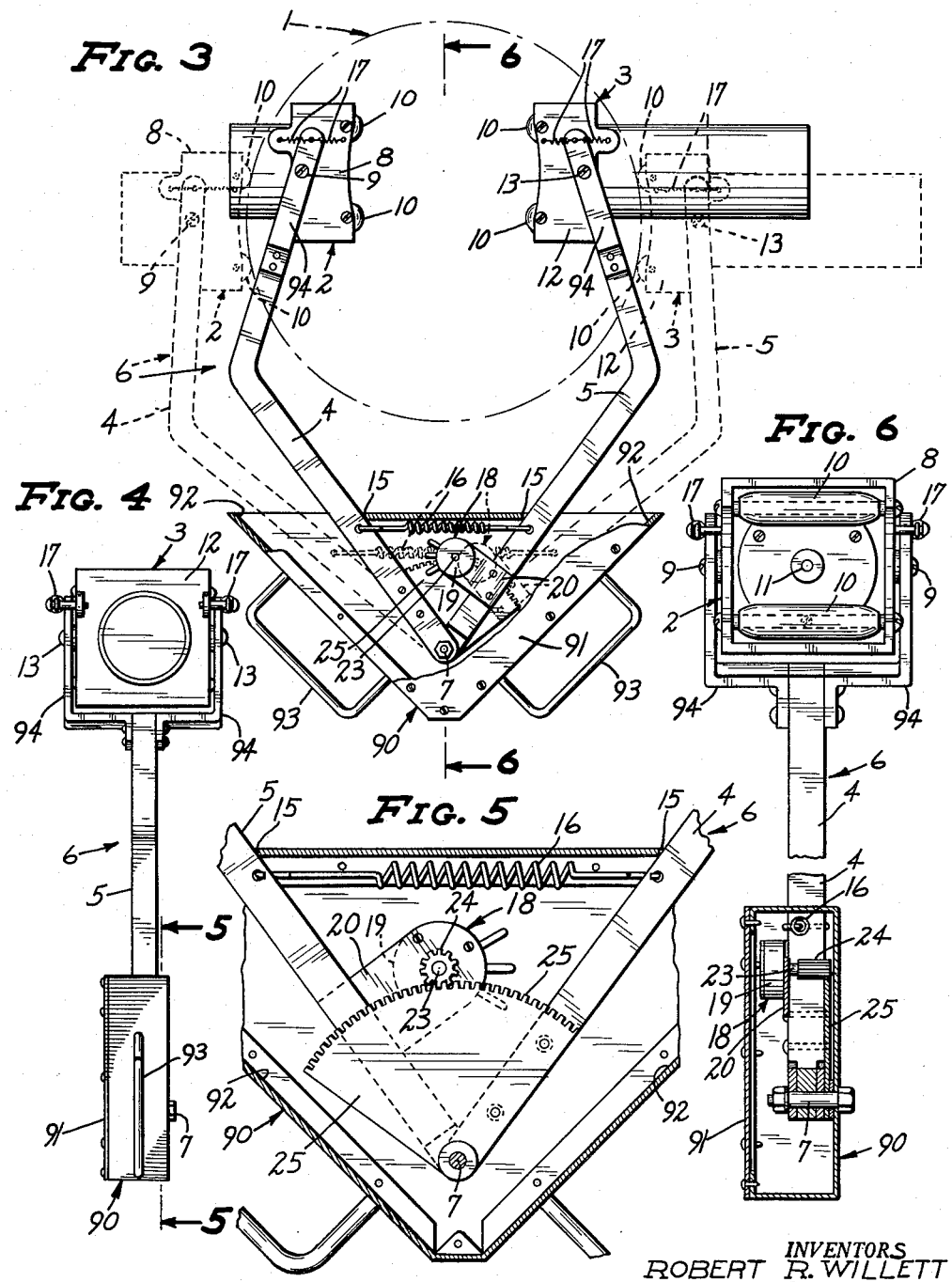

Generally stated, our present invention relates to improved methods of and means or apparatus for determining densities or relative densities of various materials. More particularly, however, our instant invention relates to improved methods and means of the general character above described which may be advantageously employed to detect and locate hidden density-reducing defective areas in various non-metallic test materials, and whereby a visual indication of the presence of and extent of defective areas may be directly obtained through the use of a suitable visual indicator, such as a conventional electrically operated meter.

While the improved methods and means or apparatus of the invention may be used for the purposes set forth in connection with a wide range of test object materials they were, nevertheless, conceived and developed primarily for use in detecting, locating and obtaining a direct indication of the presence of and extent of density-reducing defective areas, such as are usually caused by rot, in non-metallic power line poles, telephone poles, bridge trusses, live trees and the like. Because the greatest demand for the methods and means or apparatus of the invention thus far apparent is for field testing of standing wooden power line poles, the invention is herein described in connection with apparatus designed particularly for that purpose, but from this disclosure other uses of the improved methods and apparatus will be apparent to those skilled in the art.

It will be appreciated that standing wooden power line poles, and the like, being continuously exposed to the elements, are subject to decay or rot throughout their lengths and that such decay or rot is often hidden from view, being very often confined to internal areas of the pole and in which cases the decay or rotted areas are often referred to as "heart rot." Hence, the apparatus disclosed, which represents a preferred form of apparatus for carrying out the improved methods of the invention, is often referred to in the trade as a "heart rot detector."

It is, of course, highly desirable to determine the presence of and extent of hidden decayed or otherwise defective areas in electrical power line carrying poles, before they have been weakened to the point where they break even as a result of stresses caused by wind or by off-center weight of a service man climbing the pole. Hence, it is established practice of many power line owning or operating companies or bodies to inspect their power line poles periodically. However, to the date hereof, the common and generally accepted method of such periodical inspection of power line poles and the like has been a primitive and unreliable method, indeed, namely, that of rapping on the pole with a hammer and attempting to determine the condition of the pole with respect to density-reducing areas caused by rot or otherwise, by tonal variations in the resultant sound.

Of course, the fact that electrical power lines often extend across vast roadless areas is largely or wholly responsible for limiting the demand for testing apparatus for the stated purpose to that which is manually portable and operable by a single man. Obviously, the hammer used to carry out the ancient and unreliable method described above admirably meets this requirement of portability, but just as obviously the general use at this late date of such an unreliable test method points up an apparent unavailability, prior to the invention hereof, of a more dependable, accurate and otherwise durable portable apparatus for the purpose described.

In accordance with the instant invention, we provide methods which can be carried out by one man portable and operable apparatus to not only detect the presence of and locate hidden defective areas in power line poles and the like, but which will also directly indicate the extent of such rotted or otherwise defective areas. Of course, the provision of such improved methods and means or apparatus are important objectives of the instant invention.

In accordance with the instant invention energy rays are projected through test objects in an intermittent manner from a suitable energy ray emitter located adjacent one surface area of a test object, such as a power line pole, for example, so that rays therefrom will be projected into and through the test object. The energy rays that have passed through the test object, within a narrow field or angle of projection, are intercepted and detected by a suitable cooperating energy ray detector located adjacent another surface area of the test object. The emitter is of a kind that emits rays at a generally uniform rate per unit of time within a narrow field or angle of projection and detection and at a generally uniform amplitude. However, the successive energy rays emitted within a narrow field or angle of projection and detection, are affected differently by the atomic structure of different test object materials through which they pass, so that only a portion of the emitted energy rays within a narrow field of projection and detection actually pass completely through the test object, while some such rays may be stopped completely by head-on collision with an atom of the test object material and others thereof may be deflected completely out of the narrow band of projection and detection so that they never reach the detector. Hence, it will be seen that the number of energy rays actually detected over a given period of time will vary according to and generally in proportion to the over-all density of the test object material between the emitter and detector and which, over-all density, will be variably affected by the following factors, namely, (a) The distance through different test objects between the emitter and detector, which distances will usually be determined by the thickness or diameter of the test object;

(b) The different densities per unit of thickness of sound or non-defective test objects of different kinds or species; and (c) The presence of and extent of density-reducing defects in the areas of test objects traversed by the detected rays during any particular test period.

In the preferred practice of the instant invention for the purpose of defect detection and measurement, provision is made for adjustments to compensate for variable factors (a) and (b), above, prior to each test period, and variable factor (c), above, is the single variable factor employed for the purpose of indicating the presence of and extent of hidden density-reducing defective areas in power line poles or other test objects.

In the apparatus herein illustrated, compensation for variable factor (b), above, namely, the different densities per unit of thickness of sound or non-defective test objects of different kinds or species, is accomplished through the medium of what is termed a "species selector" having a manually operable control calibrated in terms of different wood species. Each different species of wood has a different average density per unit of thickness and such species are readily identifiable by a skilled operator who merely sets the control to the proper position for the species of test object material to be tested. The provision of such method and means of compensation for different density controlling species of test object materials is another important feature and object of the invention.

Particularly because different power line poles vary greatly in diameter and thickness, and further because power line poles, although generally circular in cross-section, are usually of continuously diminishing diameter or thickness from their bottoms toward their tops, it is a further and very important objective of the instant invention to provide automatic compensation for variable factor (a) above, namely, that of varying thicknesses or diameters of different test objects and of the same test object at various different points along the length thereof. In the preferred embodiment of the apparatus herein illustrated, this automatic compensation for varying thicknesses or diameters of test objects is expediently accomplished by mounting the detector and emitter on opposite arms of a mounting structure which, for want of a better name, is herein referred to as an "outside caliper." These caliper arms receive the test object between them, properly position the emitter and detector in operative position adjacent diametrically opposite surfaces of a pole or the like and actually measure or gauge the distance through the test object between the emitter and detector. In accordance with the said illustrated embodiment of the invention, the diameter or thickness compensating control, which is illustrated as and preferably is a potentiometer or equivalent current regulating device, is mounted on the outside caliper and so connected between the arms thereof as to be driven by the caliper arms under relative diameter or thickness compensating movements thereof, so as to provide completely automatic compensation for thickness or diameter variations.

As an important feature of the instant invention the detected intermittent energy rays are converted into electrical impulses and the electrical impulses thus produced, over a timed test period of predetermined duration, are then counted preferably and most expediently by a suitable electronic counter. Now to facilitate the use of a direct reading electrical meter as an indicator and to allow compensating adjustments to be made, as indicated above, for density of various test object species and diameter or thickness thereof, the impulses counted during a timed test period are converted from a numerical value to an electronically tangible current and voltage whose values are proportional to the numerical value of the counted impulses and which current and voltage values bear a definite relationship to the over-all density of the test object within the area thereof traversed by the detected rays, and hence, to the condition of the test object with respect to the presence or absence of densiy-reducing defective areas.

In further accordance with the preferred practice of the invention, and as an important feature thereof, a second or other voltage is provided and, to compensate for variable factors (a) and (b) above, namely, varying diameters or thicknesses of different test objects and different densities of different test object species per unit of thickness, the relative values of these two voltages or potentials are pre-test adjusted to generally corresponding values for a sound test object of the thickness or diameter and density controlling species of the test object to undergo test and the difference between these two voltages or potentials, the value of the first of which is proportional to the count, is used to indicate the presence of and extent of density-reducing defects in the test object area traversed by the detected rays; it being understood that this potential or voltage difference may be and preferably is impressed upon an electrical meter in which case the meter will indicate only values of the voltage proportional to the count which rise above the value of the other voltage as a result of the presence of density-reducing defects in the area of the test object traversed by the detected rays. Hence, in accordance with this preferred method and apparatus, the meter provides a direct and immediate indication of the presence of, location of, and extent of hidden density-reducing defective areas in the test object. This concept is believed to be novel and to comprise an important contribution to the art.

In the preferred apparatus illustrated, the above mentioned diameter or thickness compensating potentiometer, which is automatically adjusted by the so-called caliper mounting structure on which it is mounted, is arranged to exercise control over the value of one of the said two voltages, namely, the voltage proportional to the count and the said other voltage, and the same may be said of the species selector which may comprise a plurality of resistances of different values each representing a different test object species or a single variable resistance.

The above mentioned and other important features, objectives, and advantages of the instant invention will be further emphasized or made apparent from the following specification, claims, and appended drawings.

In the accompanying drawings, which illustrate a preferred form of apparatus by which the improved methods hereof may be expediently practiced, like characters indicate like parts throughout the several views.

Referring to the drawings:

FIG. 1 is a view illustrating a preferred embodiment of the apparatus as applied to a test object in the form of a pole, said view being partly in transverse cross-section, partly in top elevation with some parts broken away, partly in box diagram and partly in wiring diagram;

FIG. 2 is a diagrammatic view illustrating the circuitry of the so-called "matrix" stage or section of the apparatus of FIG. 1 whereby, under control of the electronic counter, there is developed the before-mentioned current and voltage whose values are proportional to the numerical values of the count;

FIG. 3 is a view in top plan, with some parts broken away and some parts shown in section, of that part of the apparatus mounting the said emitter, detector, and diameter compensating means or potentiometer and which portion of the apparatus comprises the said outside caliper arms, said view generally corresponding to the left-hand portion of FIG. 1 but illustrating the corresponding portion of the apparatus in somewhat greater detail;

FIG. 4 is a view in side elevation of that portion of the apparatus shown in FIG. 3 and looking from right to left with respect to FIG. 3;

FIG. 5 is a greatly enlarged fragmentary detail sectional view sectioned on the line 5—5 of FIG. 4; and FIG. 6 is a somewhat enlarged view showing that portion of the apparatus shown in FIG. 3 and taken on the line 6—6 of FIG. 3.

In FIG. 1 a cross-sectional view of what may be presumed to be a wooden telephone pole or equivalent test object is indicated by 1. Referring further to FIG. 1 a ray emitting head is indicated as an entirety by 2, and a detector head is indicated as an entirety by 3. The emitting head 2 and detector head 3 are respectively mounted on the free end portions of opposite ones of a pair of arms 4 and 5 of an outside caliper 6. The arms 4 and 5 are pivoted together for relative swinging movements at 7.

The caliper arm carried emitter head 2 comprises a housing 8 pivotally connected to its respective caliper arm 4 at 9. The inside of the housing 8 may be considered as being open toward the pole 1 and this housing 8 carries test object engaging abutments or stops in the nature of centering roller elements 10 equally spaced on opposite sides of the center of the housing 8. Within the housing 8 of the emitting head structure 2 is an emitter 11 which is preferably and may, for the purpose hereof, be assumed to be a low energy gamma ray emitter in the nature of an isotope formed of cobalt 57 and which is commercially identified as "CO 57"; the gamma rays emitted from this material being of such low energy as to be harmless to living tissue, at least under any period of exposure to be encountered in the use of this apparatus. The isotope is so orientated within the housing or head structure 8 that the axis thereof will intersect the axis of the pole 1 when the roller abutment elements 10 are positioned, as shown.

The detection head structure 3 comprises an inwardly opening housing 12 closely corresponding to the housing 8 of head 2 and provided with corresponding centering rollers or abutment elements 10. This housing 12 is pivotally mounted on the caliper arm 5, as at 13, and has mounted therein a detector unit comprising a conventional commercially available scintillation detector unit comprising a generally disc-shaped detector element 14, shown, and a cooperating photo-multiplier tube, not shown, and which scintillation detector unit may be obtained in its entirety from Harshaw Chemical Company of Cleveland, Ohio. This scintillation detector unit preferably does and, for the purpose hereof, may be assumed to comprise a detector head in the form of a thallium activated sodium iodide crystal of generally disc shape rigidly mounted in the housing 12 and so orientated that it will be co-axially aligned with the axis of the emitter 11 and will intersect the axis of the pole 1 when the apparatus is mounted on a pole as illustrated in FIG. 1. Of course, this crystal detector element 14 is optically coupled to the photo-multiplier tube, not shown. For the purpose hereof it may be assumed that the scintillation detector 14 is a disc having a diameter of 1¼" and a thickness of 1". However, it should be appreciated that larger detector elements such as 1½" by 1¼" or even larger will add sensitivity to the instrument and increase the over-all accuracy thereof. It will be understood that, in this type of detector unit, the detector element 14 detects gamma rays that have passed the pole or other test object and converts these into light ray impulses, and that the photo-multiplier tube, not shown, converts the light ray impulses into electrical impulses.

In an apparatus of this kind, designed particularly for testing for "heart rot" in power line poles and the like, the caliper arms permit variable spacing between the emitter head 2 and detection head 3 between at least six inches to thirteen inches and this will be seen by reference to FIGS. 1 and 5. Inward or closing movements of the caliper arms 4 and 5 are limited to an approximate six inch spacing of the heads 2 and 3, for example, by stop elements or surfaces 15. By reference to FIGS. 3 and 5, it will be seen that the caliper arms are yieldingly biased in an inward or closing direction limited by the stop surfaces or elements 15 by means of a tension spring 16. Also, by reference to FIG. 3, it will be seen that the caliper arms 4 and 5 are projected somewhat beyond the pivot axes 9 and 13 and are connected to the intermediate portions of housing anchored centering springs 17 which tend to urge the respective housings 2 and 3 to pivotal positions wherein the axes of the emitter 11 and detection element 14 are aligned when there is nothing but free air between the housing 2 and 3 and the arms are moved to a maximum closed position by the spring 16.

Mounted on the caliper arm 5 is a gear driven potentiometer indicated as an entirety by 18. The housing of this potentiometer 18, indicated by 19, is mounted fast on a bracket 20 carried by said arm 5. The arcuate resistance element of this potentiometer is indicated by 21 in FIG. 1 and the pivotally movable contact arm thereof is indicated by 22 in this figure; the contact arm 22 being mounted fast on a cooperating shaft 23 journalled in the housing 19 and having mounted fast thereon a pinion gear 24, shown in FIG. 5, and which pinion gear meshes with a sector gear 25 mounted fast on the caliper arm 4.

*Operation of Emitter and Detection Units*

As is well known, the isotope emits gamma rays in all directions from its axis and for that reason may be properly termed a spherical radiator. While the isotope radiator disintegrates at a uniform rate, the gamma rays resulting from such disintegration are of random nature with respect to direction at any given instant. Bearing in mind now that this random emission is generally spherical with the gamma rays projecting over a very wide angle from the axis of the emitter 11, it should be clear that the rays detected within any narrow solid angle or field of projection and detection are intermittent and will vary in number per unit of time inversely proportional to the square of the distance from the emitter. Hence, a scintillation detector of given normal diameter will receive emitted rays through a very narrow angle or field of projection and detection representing a small fraction of the total emission. The emitted gamma rays will strike the detector intermittently and at a variable rate per unit of time depending upon the distance between the emitter 11 and detector 14 and will vary with the square of the distance between the emitter and detector. For these reasons the diameter compensating potentiometer 18 should be a non-linear potentiometer whose taper is chosen by experiment to compensate for the above-mentioned variables. As previously indicated, a further highly pertinent fact is that the number of intermittently emitted rays actually reaching the detector within any given interval of time also varies according to the over-all density of the test object material interposed between the emitter and detector. In spite of the random rate emission from the emitter through any given narrow solid angle or field, the rate at which impulse producing rays strike and activate the detector 14 during any extended period of time, such as several seconds, with a test object of given thickness or diameter and given over-all density, will be substantially uniform under any given condition of the emitter with respect to deterioration thereof; it being understood that the isotope emitter gradually decays and that its rate of emission is gradually reduced during its useful life. This is, however, another variable factor for which we provide compensating means.

The electrical impulses present at the output of the scintillation detector head 3 are transferred to the input of a conventional electronic pulse amplifier 26 through a circuit comprising a lead 27 and ground connections 28 and 29. The output of the pulse amplifier 26 is connected to a unit 30 commonly referred to in the art as a "one-shot multi-vibrator," or alternatively, as a "Schmitt trigger," and the well known function of which is to clip all of the electrical impulses to the same general amplitude and width; the said output of the pulse amplifier 26 being connected to the input of the unit 30 through an electronic timer 31 whose function is to render the apparatus operative for timed test periods of desired duration and which, timer, is preferably manually set in operation at the beginning of each test period. The circuit connecting the pulse amplifier 26 to the electronic timer comprises a lead 32 and ground connections 29 and 33. The circuit connecting the electronic timer 31 to the unit 30 comprises a lead 34 and ground connections 33 and 35. It may be assumed that the connection between leads 32 and 34 are made and broken by electronically controlled relay switches, not shown, within the electronic timer unit 31, and which switches are normally open but are closed during the timed periods of operation. For the purpose of the instant illustration, we have chosen a standard test period having a duration of approximately fifteen seconds to which the electronic timer has been pre-adjusted. It will, of course, be appreciated that longer time periods can be used when practical and will, in fact, increase the accuracy of the indicated results.

The output of the unit 30 is connected to the input of a multi-stage binary counter stage or section 36 through a circuit comprising a lead 37, ground connection 35 and a ground connection 38. While the number of stages in this binary counter may be widely varied, we have found a fourteen stage binary counter to be generally satisfactory for the purpose of testing density of materials. While various different well known types of counters may be employed for the purpose of practicing the instant invention, we preferably employ a binary electronic counter of the kind wherein each stage comprises a transistorized bi-stable multi-vibrator with diode steering. Multi-stage binary electronic pulse counters are, as implied above, well known in the art, being commonly employed in digital computers, for example, and complete disclosures of binary counters suitable for our instant purpose are to be found in numerous prior publications; one such publication reference being "Design of Transistorized Circuits for Digital Computers" published by John F. Rider Publisher, Inc., New York, copyright, 1959; Library of Congress Catalog Card Number 58–13426; Chapter One, pages 7–9; Chapter Two, pages 17–22; and Chapter Eleven, pages 273–306. Each of the fourteen stages of the binary counter 36 is connected to the input of a matrix stage or section 39 by a circuit comprising ground connections 38 and 40 and a different one of fourteen leads respectively indicated by $2^0$ to $2^{13}$, inclusive.

It is well understood that in binary electronic counters of a kind employed herein each of the stages, of which there are fourteen in the present instance, are connected in series and the first stage, only, is directly operated by positive pulses produced upon energization of the unit 30; the subsequent stages being activated by a positive pulse created upon de-energization of an immediately preceding stage; it being understood that the output of a stage in the energized state is a negative value with respect to the clear state of that stage and that this represents the operative or output lead energizing state of that stage. Therefore, when a stage is cleared or de-energized, the output is switched from the aforementioned negative value to a less negative value, which, in effect, represents a positive pulse and which positive pulse is utilized to energize the following stage; it being further understood that each stage is sensitive only to positive pulses. As the name "binary counter" implies it essentially counts to the base two; the first impulse counted causing energization of lead $2^0$; the second impulse counted causing de-energization of lead $2^0$ and resultant energization of lead $2^1$; the third impulse counted causing energization of lead $2^0$; the fourth impulse counted causing de-energization of lead $2^0$ and resultant de-energization of lead $2^1$ which, in turn, energizes lead $2^2$; this progression continuing to a total count of 16,383 impulses at which time all of the leads $2^0$ through $2^{13}$ will be energized. In practice, however, the duration of the test period is determined by the setting of the timer (15 seconds in accordance with the present example) will be such that the maximum actual count will always be well under the total possible count.

As previously indicated, the purpose of the matrix stage or section 39 is to convert the output of the fourteen stage binary counter to a single current and voltage proportional to the count to facilitate the use of a meter as an indicator and to allow compensation to be made in the circuits for the densities of the various species of wood and the varying thicknesses or diameters of objects to be tested. This matrix 39 comprises a plurality of resistors of a number corresponding to the number of stages of the binary counter and their respective output leads $2^0$ through $2^{13}$. These resistors, of which there are fourteen in accordance with the present example, are respectively indicated by $2^{0\prime}$ through $2^{13\prime}$, which are respectively connected in series with leads or conductors $2^0$ through $2^{13}$. The resistors $2^{0\prime}$ through $2^{13\prime}$ are of progressively diminishing value; the smallest value, namely that of the resistor $2^{13\prime}$, being generally chosen in regard to the maximum current load available at this counter output stage; each resistor beginning with resistor $2^{1\prime}$ being of one-half the resistance value of the next preceding resistor. Hence, if the value of resistor $2^{0\prime}$ be assumed to be 128,000,000 ohms, the next succeeding resistor $2^{1\prime}$ would have a value of 64,000,000 ohms and so on until we reach the resistor $2^{13\prime}$ which would have a value of 16,000 ohms, or 16K ohms.

The output of each one of the resistors $2^{0\prime}$ through $2^{13\prime}$ is connected to the cathode 41 of a different one of a series of fourteen solid state diodes 42, whose anodes 43 are connected to a common lead or conductor 44 by a different one of a plurality of leads or conductors 45. Interposed in the common lead or conductor 44 between each of the immediately adjacent leads 45 is a solid state diode 46 whose anodes face left in FIG. 2 which is toward the first resistor $2^{0\prime}$ and its serially connected diode 42. With reference to FIG. 2 the left-hand end of common lead 44 is connected to ground connection 40 through a load resistor 47 provided by a zero adjusting potentiometer 48 comprising said load resistor 47 and a movable contact arm or wiper 49.

The diodes 42 allow current to flow from their respective cooperative stages of the binary counter which are in set or operative condition, but prevent these currents from being lost into the outputs of those stages of the counter which are in clear condition; this being because, by arbitrary choice, the "set" condition of each counter stage is, as stated, a negative value with respect to the chosen clear or inoperative condition of that stage. The diodes 46 on the other hand direct the available current for each counter stage to the common load resistor 47 of the matrix. As previously indicated, the values of the resistances $2^{0\prime}$ through $2^{13\prime}$ are chosen so that the output from any single stage or primary set stage of the binary counter or plurality of set stages of the binary counter will be proportional to the digital count value of the set stage or stages.

The output of the matrix 39 is connected to the input of a conventional D.C. amplifier 50 through the sliding contact arm 49 of the potentiometer 48 and a lead or conductor 51. The output of the D.C. amplifier 50 is connected to the sliding contact arm 22 of the potentiometer 18 through conductor 52 in which is interposed a visual indicator in the nature of a microammeter 53 which may be calibrated in terms of pole or other test object condition with respect to the presence of and extent of "heart rot" or other density-reducing defects. This D.C. amplifier output circuit comprises lead 52, indicating meter 53, the contact arm or wiper 22 of potentiometer 18 and further comprises varying portions of the resistance element 21 of potentiometer 18, a lead 54, a ground connection 55 and an amplifier ground connection 56. By reference to the right-hand portion of FIG. 1 it will be noted that there is interposed in lead 52 between the D.C. amplifier 50 and indicating meter 53 a normally open manually operated switch 57 which is closed to render the meter operative only at the termination of a timed testing period as determined by the setting of the electronic timer 31 to obtain the desired indication. As a precautionary measure against possible burning out of the meter in the circuitry disclosed, the switch 57 between the amplifier 50 and the meter 53 should not be closed except at the termination of the test periods at which time the potential difference across the meter 53 is automatically reduced to a value not injurious to the meter. While the switch 57 is shown and described as a normally open manually operated switch we contemplate substituting therefor an electrically operated switch which will automatically close at the termination of the timing period and will be automatically reopened upon resetting of the apparatus for a new test. Applied in shunt across the indicating meter 53 is a manually operated meter sensitivity adjusting potentiometer or variable resistance 58 which may be preset to obtain the desired meter sensitivity. However, this sensitivity control may be omitted if a meter of suitable sensitivity is available.

The photo-multiplier tube of the detector head 3 (not shown) is energized from a high voltage power supply of conventional character indicated by 59 through a D.C. circuit comprising a conductor 60, ground connection 28 and a ground connection 61. The high voltage power supply 59 is, in turn, powered from a suitable source of low voltage direct current, such as a battery 62, through a circuit comprising a conductor 63, a ground connection 64, a lead 65 having interposed therein a normally open manually operated off-on switch 66, and the ground connection 61.

The pulse amplifier 26, the electronic timer 31, the unit 30 (alternatively termed a "Schmitt trigger" and "multi-vibrator"), the binary counter 36, the D.C. amplifier 50 and other circuits to be hereinafter described are powered from a suitable source of D.C. potential, such as a battery 67, through circuits comprising a common battery lead 68 having interposed therein a normally open manually operated off-on switch 69 which latter, as indicated, is connected for common operation with the off-on switch 66. The power supply circuit for the pulse amplifier 26 comprises part of common lead 68, a lead 70, ground connection 29, ground connection 64, part of lead 63 and a lead 71. The power supply circuit for the electronic timer 31 comprises part of common lead 68, a lead 72, ground connection 33, ground connection 64, part of lead 63 and lead 71. The power supply circuit to the unit 30 comprises part of common lead 68, a lead 73, ground connection 35, ground connection 64, part of lead 63 and lead 71. The power circuit for the binary counter 36 comprises part of lead 68, a lead 74, ground connection 38, ground connection 64, part of lead 63 and lead 71. The power supply circuit for the D.C. amplifier 50 comprises all of lead 68, ground connection 56, ground connection 64, part of lead 63 and lead 71. The off-on switch 69 is common to all of said power supply circuits.

As previously indicated, one of the variable factors which must be compensated for to obtain an accurate direct indication, by the indicating meter 53, of the condition of a pole, tree or other object under test, with respect to internal deterioration or rot, is the normal variable densities per unit of thickness of different materials or species of materials; bearing in mind that power poles, bridge trestles, telephone poles, and the like, while generally of wood, are of various different species of wood such for example as pine, cedar, birch, spruce and so forth. Of course, there are more species than above named and also it should be borne in find that at least some of the named species can be broken down into a plurality of sub-species each of which may vary considerably in density. For the purpose of presetting the apparatus to give a correct indication with any particular species of material being tested, we provide, in accordance with the present example, a species selector 75 comprising a series of resistances of different values respectively indicated by 76 through 83 and a manually operated selector switch 84. However, it will be understood that a satisfactory species selector 75 can also be provided by a single variable resistance or potentiometer providing the latter is suitably calibrated. Common ends of resistors 76 through 83 are connected together and to one side of battery 67 by conductor means comprising a lead 85 and part of lead 68. The other common ends of the resistors 76 through 83 are adapted to be individually and selectively connected to the other side of battery 67 through selector switch 84, a lead 86, all of the resistance element 21 of potentiometer 18, lead 54, ground connection 55, ground connection 64, part of lead 63, and lead 71.

*Operation*

It should be appreciated that the scintillation detector element 14 is activated only by projected gamma rays from the isotope 8 falling within a very narrow angle or field, it may be desirable to test for "heart rot" at a number of positions along the length of the pole, tree or the like. To test for internal or heart rot at any given position along the length of a pole, beam, tree or the like, the operation will be substantially as follows.

(1) First and before applying the caliper arm-carried heads 2 and 3 to the object of test and while the caliper arms are in and held in their maximum closed position by the spring 16 to provide the predetermined minimum spacing between the emitter 11 and detector element 14 and with an air space between these elements 11 and 14 the following procedure must be followed:

A. Close the coupled switches 66 and 69.

B. Set the density control switch 84 to close the circuit through a resistor 87 of the species selector unit (this position being shown by dotted lines in FIG. 1) and which resistor 87 serves as a calibrating resistor, rather than a species selecting resistor.

C. Simultaneously set the electronic timer 31 to its "Time" condition to close the circuit between leads 32 and 34 for the predetermined period of time, which may be fifteen seconds for example, and set the fourteen stage binary counter to its operative or "Count" condition. In accordance with the instant example this simultaneous dual operation is accomplished by means comprising mechanically coupled, two-position, manually operated switches, indicated respectively by 88 and 89.

D. The meter controlling switch 57 is now closed and while it is closed the zero adjusting potentiometer 48 is adjusted to a position wherein a zero meter reading is obtained, after which the switch 57 is opened and the switches 88 and 89 are simultaneously shifted from their respective "Time" and "Count" positions shown by full lines in FIG. 1 to their respective "Reset" and "Clear" positions shown by dotted lines in FIG. 1. The apparatus is now adjusted so that the meter indicator 53 will provide true readings under the current condition of deterioration of the isotope and this operation need not be repeated during any working day period due to the slow rate of deterioration of the isotope.

As indicated in FIG. 1, the unit comprising the caliper arms 4 and 5 and heads 2 and 3 is connected to the remaining apparatus through long cable leads and the said remaining apparatus is contained in a separate housing or casing, not shown, which can always be placed at ground level to facilitate placing of the unit comprising elements 2, 3, 4 and 5 at different positions along an object to be tested.

(2) The unit comprising said caliper arms 4 and 5 and heads 2 and 3 is now placed on the desired position on a pole or the like to be tested as shown in FIG. 1 and in which position and condition the combined action of the tension spring 16 and rollers 10 will cause self-centering of the heads 2 and 3 on the pole or the like, so that the rays projected from the emitter 11 and received by the detector element 14 will intersect the axis of the pole or the like. Preferably, the tension spring 16 will be of sufficient strength to cause the heads 2 and 3 to retain their placed positions and support the structure on the pole.

(3) With the unit comprising caliper arms 4 and 5 and heads 2 and 3 positioned on the pole as illustrated in FIG. 1, the diameter or thickness compensating potentiometer 18 will be automatically set to condition the apparatus for accurate indications of heart rot with a pole or other test object of that thickness or diameter and the reason for this function will be emphasized later.

(4) Next the species selector switch 84 is set in a position to place in circuit one of the resistors 76 through 83 representing the particular species of wood or other material subject to test. With the apparatus thus set a voltage will be impressed upon the meter 53 which will be equal to the voltage of the battery 67 less the voltage drop across the selected now operative one of the resistors 76 through 83 and a portion of the resistance element 21 of potentiometer 18 determined by the position of the potentiometer arm 22. The resistance values of the potentiometer and the resistors 76 through 83 must be assumed to have been so adjusted or selected as to values that, with a sound object of the species under test, the voltage impressed upon the meter indicator 53 from the battery source 67 will exactly match the voltage which will be impressed upon the meter by the D.C. amplifier 50. Otherwise stated, the relative values of the first voltage supplied to the meter by the matrix 39 and amplifier 50 under control of the counter 36 and another or second voltage supplied by the battery source 67 will, by the adjustments made, be of generally corresponding values for a sound test object of the diameter or thickness and density controlling species selected, so that the meter will read zero to indicate a sound test object condition, and the value of the first voltage, which is proportional to the numerical value of the count, will rise above the value of the second voltage when the detected rays intercept a density-reducing defective test object area and will then cause deflection of the meter to indicate the presence and extent of the detected defective area.

(5) Next the switches 88 and 89 are simultaneously set to their respective "Reset" and "Clear" positions, if they are not already in such positions, after which they are simultaneously moved to their respective "Time" and "Count" positions.

(6) At the end of the test period determined by the electronic timer 31 the normally open meter controlling switch 57 is closed and held closed during such time as it takes to read the meter 53. Under these conditions, if the test object is sound, there will be zero current flow through the meter 53, due to the fact that the voltages respectively impressed upon the meter by the D.C. amplifier 50 on one hand and the battery source 67 on the other hand, under control of the species selector 75 and potentiometer 18, will be equal. On the other hand if a rotted internal area of the pole, such as indicated by dotted lines at 1' in FIG. 1, is intercepted by gamma rays directed toward the detector, the over-all density will be decreased, the count will increase proportionally and the voltage delivered by the matrix 39 to the D.C. amplifier 50 and by the D.C. amplifier 50 to the meter indicator 53 will be proportionately increased with respect to the voltage impressed on the meter by the battery source 67 through the selector resistor of the species selector 75 and potentiometer 18. As previously indicated, there will be no current flow through the meter when the area of the test object is sound. However, when the area under test is not sound the potential applied by the D.C. amplifier will become negative with respect to the voltage supplied by the D.C. battery source 67 through the species selector 75 and potentiometer 18, which will result in current flow through the meter from the D.C. amplifier through a circuit comprising lead 52, part of the resistor element 21 of potentiometer 18, lead 54, ground connection 55 and ground connection 56, thus causing deflection of the meter from its zero position to a degree indicative of the presence and extent of the heart rot detected.

It should be appreciated that, whereas in the apparatus illustrated, the relative values of the first and second voltages are adjustably varied to bring the same to generally corresponding values for a sound test object condition for test objects of different thicknesses or diameters and density controlling species by adjusting the value of the second voltage, namely, that supplied by the battery source 67 with relation to the first voltage, namely, that supplied by the matrix 39 and D.C. amplifier 50 under control of the counter 36; the said relative values of the said first and second voltages can also be adjustably varied by adjusting the values of the first voltage with respect to the second voltage. This latter mentioned adjustable variation of the first voltage with respect to the second voltage, for the purposes of test object diameter or thickness compensation, and test object species compensation, can be accomplished in connection with any of several circuits having control over the value of the first voltage proportional to the numerical value of the count, and if desired, by operatively associating either or both of the species selector 75 and diameter or thickness compensating potentiometer 18 with any of the several circuits controlling the value of the first voltage. For example, such first voltage compensations could be made between the matrix 39 and amplifier 50, or between the amplifier 50 and meter 53. Furthermore, it should also be apparent to those skilled in the art that said first voltage value adjustments could also be made by adjustably varying the duration of the timed test periods under control of the electronic timer. It will, of course, be understood that, in the specific embodiment of the invention illustrated, the maximum voltage available from the second potential source 67 must be greater than the maximum voltage available from the first potential source comprising the counter 36, matrix 39, and amplifier 50, in order that the matching of values of the first and second voltages can be achieved by adjustably reducing values of the second voltage.

By reference particularly to FIGS. 3–6, it will be seen that the pivotally connected end portions of the caliper arms 4 and 5 are enclosed within a generally V-shaped housing structure 90 and that the pivotal connection 7 between the arms 4 and 5 is provided by a nut-equipped bolt passing through one wall of the said housing 90 and pivotally connecting the arms 4 and 5 together and to said housing 90. This housing encloses the diameter or thickness compensating potentiometer 18 and its operating mechanism and the tension spring 16 and is provided with a removable cover plate 91 to provide accessibility to the enclosed parts. By further reference particularly to FIGS. 3 and 6, it will be seen that the arms 4 and 5 work in openings in the housing structure 90 and that relative inward movements of the arms 4 and 5 are limited by stop shoulders or abutment portions 15 defined by the housing structure 90 and that relative outward or opening movements of the arms 4 and 5 are limited by stop or abutment portions 92 defined by the housing 90. By reference to FIG. 3 it will be seen that the housing structure 90 is provided with carrying handles 93 which, along with the complete housing structure 90, were omitted in FIG. 1. By reference now particularly to FIGS. 4 and 6, it will be seen that the outer free end portions of the caliper arms 4 and 5 are bifurcated, as at 94, to receive their respective head structures 2 and 3 therebetween.

For the purpose of heart rot detection in power line poles and the like where the test objects are essentially of considerable thickness and where portability is of extreme importance, the radio-active isotope gamma ray emitter of the kind described above has been found most highly desirable. However, other types of emitters can be employed and may be found preferable in some applications of the invention, but it is believed that the emitters employed should emit rays coming within the broad classification of gamma rays, X-rays, beta rays, and alpha rays. The primary advantage of gamma rays over beta rays and alpha rays is that the former are generally of greater amplitude than the latter. X-ray emitters, on the other hand, are generally bulky and heavy and require considerable operating power, all of which generally defeats the purpose of portability.

What is claimed is:

1. In an apparatus of the class described, an energy ray emitter adapted to be placed in definite close space relationship to a surface area of a test object to project energy rays into and through the test object, a cooperating energy ray detector adapted to be placed in definite close space relationship to another surface area of the test object to detect emitted energy rays that have passed through the test object with a narrow field of projection, means converting the detected intermittent energy rays into electrical impulses, an electrical impulse counter, circuit means feeding the detected electrical impulses to said counter, a timer controlling said circuit means to establish test periods of predetermined duration, said energy ray emitter being of a kind wherefrom emitted rays are all of the same general energy level and are emitted at the same general rate per unit of time throughout timed test periods established by the timer, means comprising said impulse counter for converting impulses counted during a timed test period into a first electrical voltage of a value proportional to the numerical value of the counted electrical impulses and which first voltage bears a definite relationship to the over-all density of the test object throughout the area thereof traversed by the detected energy rays, a primary circuit wherein said first voltage is present, an electrical meter, a secondary circuit wherein a second voltage is present, means for adjustably controlling the relative values of the first and second voltages to the end that the first and second voltages will be approximately equal for a sound test object and the value of the first voltage will exceed that of the second voltage when the detected rays encounter density-reducing defective areas in test objects, and circuit means for impressing upon the meter and voltage proportional to differences between the first and second voltages, whereby the meter will provide a direct reading indication of and extent of density-reducing defects in portions of the test objected traversed by the detected rays.

2. In an apparatus of the class described, an energy ray emitter adapted to be placed in definite close space relationship to a surface area of a test object to project energy rays into and through the test object, a cooperating energy ray detector adapted to be placed in definite close space relationship to another surface area of the test object to detect emitted energy rays that have passed through the test object with a narrow field of projection, means converting the detected intermittent energy rays into electrical impulses, an electrical impulse counter, circuit means feeding the detected electrical impulses to said counter, a timer controlling said circuit means to establish timed test periods of predetermined duration, said energy ray emitter being of a kind wherefrom emitted rays are all of the same general energy level and are emitted at the same general rate per unit of time throughout timed test periods established by the timer, means comprising said impulse counter for converting impulses counted during a timed test period into a first electrical voltage of a value proportional to the numerical value of the counted electrical impulses and which first voltage bears a definite relationship to the over-all density of the test object throughout the area thereof traversed by the detected energy rays, a primary circuit wherein said first voltage is present, an electrical meter, a secondary circuit wherein a second voltage is present, means for adjustably controlling the relative values of the first and second voltages to the end that the first and second voltages will be approximately equal for a sound test object and the value of the first voltage will exceed that of the second voltage when the detected rays encounter density-reducing defective areas in test objects, and circuit means for impressing upon the meter and voltage proportional to differences between the first and second voltages, whereby the meter will provide a direct reading indication of and extent of density-reducing defects in portions of the test object traversed by the detected rays, said means for adjustably controlling the relative values of the first and second voltages comprises a potentiometer so related with one of said primary and secondary circuits as to adjustably control the value of its respective first or second voltage.

3. The apparatus defined in claim 2 further comprising an outside caliper having a pair of arms connected for relative movements such as to receive test objects of different thicknesses therebetween, and wherein the emitter is mounted on one of said caliper arms and the detector is mounted on the other of said caliper arms, the caliper arms being provided with test object engaging abutment surfaces and the emitter and detector being mounted on the respective caliper arms to be in operative position with respect to the test object when said abutment surfaces are in engagement with opposite surfaces of the test object, and wherein the said potentiometer is mounted on said outside caliper, and means establishing driving connections between the caliper arms and potentiometer whereby the latter will be automatically adjusted to compensate for different test object thicknesses.

4. The apparatus defined in claim 2 wherein the said impulse counter is a multi-stage electronic impulse counter having a series of stages each representing a different count value and the respective count values of which progressively increase at a constant rate, the counter having an output circuit for each of said series of stages, the said means for converting the impulses counted during a timed test period comprising said counter output conductors of which there is a different one for each counter output circuit, said conductors each having serially interposed therein a resistance and a diode, the resistor of each counter stage having a value proportional to the digital value of its respectively associated counter stage and the diodes in said output conductors serving only to allow uni-directional flow through their respective conductors, the values of the resistances in said series of conductors progressively decreasing at a constant rate inversely proportional to the count value progression of said series of counter stages, conductor means comprising a different one of a plurality of diodes connecting a point on each said output conductor following its respective resistance and diode to a corresponding point on the next adjacent output conductor in the series thereof, the last said diodes being connected to direct current from each said output conductors to a point common to all of said counter output circuits and whereat there is developed the said voltage proportional to the count.

5. The apparatus defined in claim 4 in which the counter is a binary counter wherein the numerical value of each stage succeeding the first stage in the series of stages is twice that of the next preceding stage, and in which apparatus the value of the resistance in each said output circuit conductor succeeding the first in the series thereof is one-half the value of resistance in next preceding output conductor.

6. In an apparatus of the class described, an energy ray emitter adapted to be placed in definite close space relationship to a surface area of a test object to project energy rays into and through the test object, a cooperating energy ray detector adapted to be placed in definite close space relationship to another surface area of the test object to detect emitted energy rays that have passed through the test object with a narrow field of projection, means converting the detected intermittent energy rays into electrical impulses, a multi-stage electrical impulse counter, circuit means feeding the detected electrical impulses to said counter, a timer controlling said circuit means to establish test periods of predetermined duration, said energy ray emitter being of a kind wherefrom emitted rays are all of the same general energy level and are emitted at the same general rate per unit of time throughout timed test periods established by the timer, and means comprising said impulse counter for converting the impulses counted during a timed test period into an electrical value of a magnitude proportional to the numerical value of the counted electrical impulses and which electrical value bears a definite relationship to the over-all density of a test object throughout the area thereof traversed by the detected energy rays, the said impulse counter being a multi-stage electronic impulse counter having a series of stages each representing a different count value and the respective count values of which progressively increase at a constant rate, the counter having an output circuit for each of said series of stages, the said means for converting the impulses counted during a timed test period comprising said counter output circuits, said output circuits comprising a series of output conductors of which there is a different one for each counter output circuit, said conductors each having serially interposed therein a resistance and a diode, the resistor of each counter stage having a value proportional to the digital value of its respectively associated counter stage and the diodes in said output conductors serving only to allow uni-directional flow through their respective conductors, the values of the resistances in said series of conductors progressively decreasing at a constant rate inversely proportional to the count value progression of said series of counter stages, conductor means comprising a different one of a plurality of diodes connecting a point on each said output conductor following its respective resistance and diode to a corresponding point on the next adjacent output conductor in the series thereof, the last said diodes being connected to direct current from each said output conductors to a point common to all of said counter output circuits and whereat there is developed the said electrical value proportional to the count.

7. The apparatus defined in claim 6 in which the counter is a binary counter wherein the numerical value of each stage succeeding the first stage in the series of stages is twice that of the next preceding stage, and in which apparatus the value of the resistance in each said output circuit conductor succeeding the first in the series thereof is one-half the value of resistance in next preceding output conductor.

References Cited in the file of this patent
UNITED STATES PATENTS

| | | |
|---|---|---|
| 2,920,206 | Heller | Jan. 5, 1960 |
| 3,010,018 | Ziffer | Nov. 21, 1961 |

FOREIGN PATENTS

| | | |
|---|---|---|
| 1,064,725 | Germany | Sept. 3, 1959 |